United States Patent [19]

Otsu et al.

[11] Patent Number: 4,670,520

[45] Date of Patent: Jun. 2, 1987

[54] METHOD FOR MODIFYING POLYFUMARIC ACID DIESTER

[75] Inventors: Takayuki Otsu, Nara; Yoshishige Murata; Naoyuki Amaya, both of Ibaragi, all of Japan

[73] Assignee: Nippon Oil & Fat Co., Ltd., Tokyo, Japan

[21] Appl. No.: 823,225

[22] Filed: Jan. 28, 1986

[30] Foreign Application Priority Data

Feb. 28, 1985 [JP] Japan .................................. 60-37662

[51] Int. Cl.$^4$ .............................................. C08F 8/00
[52] U.S. Cl. .................................. 528/503; 525/329.5; 525/383; 525/388; 526/271; 528/481; 528/480; 525/374
[58] Field of Search ...................... 525/329.5, 383, 388, 525/374; 526/271; 528/481, 507

[56] References Cited

U.S. PATENT DOCUMENTS 3,558,566 1/1971 Balwé et al. ........................ 526/321
3,923,752 12/1975 Guse et al. ........................... 526/321
4,383,053 5/1983 Honda ................................. 526/321

Primary Examiner—Joseph L. Schofer
Assistant Examiner—Bernard Lipman
Attorney, Agent, or Firm—Jordan and Hamburg

[57] ABSTRACT

According to the invention, a method for modifying a polyfumaric acid diester is provided. The method comprises subjecting the polyfumaric acid diester to thermal treatment to thereby obtain a polyfumarate having carboxyl groups. The polyfumaric acid diester is obtained by polymerizing a fumaric acid diester represented by the following general formula of:

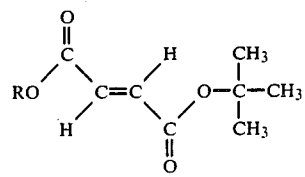

wherein R represents an alkyl group having 1 to 12 carbon atoms, a cycloalkyl group having 3 to 12 carbon atoms or an organic residue having at least one aromatic ring.

5 Claims, No Drawings

METHOD FOR MODIFYING POLYFUMARIC ACID DIESTER

BACKGROUND OF THE INVENTION

1. Field of the Invention:

The present invention relates to a method for modifying a polyfumaric acid diester, and more particularly to a method for modifying a polyfumaric acid diester by the introduction of carboxyl groups in the polyfumaric acid diester.

2. Related Art Statement:

Known polycarboxylic acids include polyacrylic acid, polymethacrylic acid and polymaleic acid, and they are industrially used as polyfunctional polymers. The known polycarboxylic acids are also cross-linked with metals to form metal salts which are used as viscosity increasing agents, dispersing agents or adhesives. However, these known polycarboxylic acids suffer multifarious problems in syntheses thereof, including difficulties encountered in control of the molecular weights and corrosion problems of the apparatuses used for the syntheses thereof. For instance, in preparation of polyacrylic acid and polymethacrylic acid by the polymerization of acrylic acid and methacrylic acid, the polymerization reaction proceeds too fast with an extremely large exothermic reaction heat to make it hard to control the polymerization reaction. In addition, since both of the monomers and polymers are hygroscopic, the polymers can be prepared only through solution and emulsion polymerization processes, leading to difficulty in purification the resultant polymers.

Although polyacrylic acid or polymethacrylic acid may also be obtained through hydrolysis of polyacrylonitrile, a polyacrylic ester or a polymethacrylic ester, such hydrolysis involves a hydrolyzing step wherein any of the aforementioned materials is hydrolyzed by the use of a strong acid or base, which causes problems in the subsequent purifying step.

On the other hand, polymaleic acid is obtained through polymerization of maleic anhydride. However, since maleic anhydride is scarcely homo-polymerizable when reacted singly, it is usually matrix-polymerized in the presence of a matrix made of, for example polyvinylpyrrolidone. However, even if maleic anhydride is polymerized in the presence of such a matrix, the polymerization degree of the sythesized polymaleic anhydride is low and the synthesized polymaleic anhydride cannot be isolated from the matrix.

On the contrary, polyfumaric acid diesters each having a number average molecular weight of from 1,000 to 200,000 may be easily prepared by any of the bulk, suspension, solution and emulsion polymerization processes. However, since the polyfumaric acid diesters include no intramolecular polar groups, they are poor in reactivity so that it is difficult to improve their properties, such as adhesiveness, heat resistance and rigidity, by reacting them with modifiers.

OBJECTS AND SUMMARY OF THE INVENTION

Accordingly, a principal object of this invention is to provide a method for modifying a polyfumaric acid diester to obtain a polyfumarate having reactive carboxyl groups by subjecting a polyfumaric acid diester to a very simple thermal treatment.

Another object of this invention is to provide a method for modifying a polyfumaric acid diester to obtain a polyfumarate having reactive carboxyl groups, the polyfumarate being capable of reacting with another materaial to form a polymer or composition which is improved in wetting property with an inorganic material and also in other properties including adhesiveness, heat resistance and rigidity.

A further object of this invention is to provide a method for modifying a polyfumaric acid diester to obtain a polyfumarate having carboxyl groups which serve as reactive groups when the product polyfumarate is cross-linked.

A still further object of this invention is to provide a method for modifying a polyfumaric acid diester to obtain a polyfumarate having a carboxyl groups, the polyfumarate being capable of reacting with a metal salt to give an ionomer.

Yet a further object of this invention is to provide a method for modifying a polyfumaric acid diester to obtain a polyfumarate having reactive carboxyl groups and having a desired molecular weight freely predetermined or selected within a possible wide range of molecular weight.

The above and other objects of the invention will become apparent from the following detailed description.

A method for modifying a polyfumaric acid diester, provided in accordance with this invention, comprises subjecting the polyfumaric acid diester having a number average molecular weight of 1,000 to 200,000 to thermal treatment, to thereby obtain a polyfumarate having carboxyl groups, said polyfumaric acid diester being obtained by polymerizing a fumaric acid diester represented by the following general formula of:

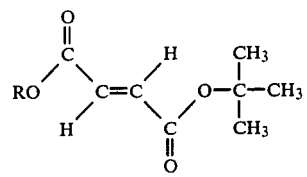

wherein R represents an alkyl group having 1 to 12 carbon atoms, a cycloalkyl group having 3 to 12 carbon atoms or an organic residue having at least one aromatic ring.

DESCRIPTION OF THE INVENTION

The present invention will now be described in detail.

The polyfumaric acid diesters used in the invention are those obtained by polymerizing fumaric acid diesters represented by the following general formula of:

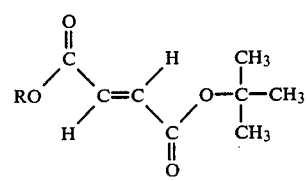

wherein R represents an alkyl group having 1 to 12 carbon atoms, a cycloalkyl group having 3 to 12 carbon atoms or an organic residue having at least one aromatic ring.

If the carbon number of the alkyl or cycloalkyl group indicated by R in the structural formula set forth above is 13 or larger, the polymerizability of the fumaric acid diester is so lowered that difficulties are encountered in the formation of the polyfumaric acid diester. The fumaric acid diester, which is used as the starting material, has ester residues, at least one of which is a tert-butyl group. Examples of such a fumaric acid diester include any one or a mixture of tert-butylmethyl fumarate, tert-butylethyl fumarate, tert-butyl-iso-propyl fumarate, tert-butyl-n-propyl fumarate, tert-butyl-n-butyl fumarate, tert-butyl-iso-butyl fumarate, tert-butyl-sec-butyl fumarate, di-tert-butyl fumarate, tert-butylcyclopentyl fumarate, tert-butylcyclohexyl fumarate, tert-butyl-2-ethylhexyl fumarate, tert-butyl-biscyclohexyl fumarate, tert-butylbenzyl fumarate, tert-butyl-$\beta$-phenethyl fumarate and tert-butyl-$\alpha$-phenethyl fumarate.

These fumaric acid diesters may be synthesized by a variety of conventional processes. For example, a maleic acid monoester is synthesized from maleic anhydride and a first alcohol through an addition reaction, and the maleic acid monoester is esterified with a second alcohol or an olefin in the presence of an acid catalyst, such as sulfuric acid, hydrochloric acid, p-toluenesulfonic acid or methanesulfonic acid, to obtain a maleic acid diester having a tert-butyl group. The maleic acid diester having a tert-butyl group is then isomerized in the presence of a pertinent catalyst for isomerization to obtain a desired fumaric acid diester. An alternative process for the synthesis of a fumaric acid diester having a tert-butyl group comprises the step of forming an acid chloride compound of a maleic acid monoester, followed by the step of reacting with a second alcohol in the presence of a pertinent amine compound.

The aforementioned fumaric acid diester is polymerized to prepare a polyfumaric acid diester, which is used in the invention, through any of the known radical polymerization processs including bulk polymerization, suspension polymerization, solution polymerization and emulsion polymerization processes. For example, in a bulk polymerization process a selected fumaric acid diester may be added with a proper radical initiator and heated to be polymerized to thus obtain a desired polyfumaric acid diester, which is used in the invention.

A desired polyfumaric acid diester may also be prepared through a solution polymerization process wherein the corresponding fumaric acid diester is added with a proper radical polymerization initiator and an organic solvent and then heated to be polymerized. Any organic solvents may be used as far as they dissolve the monomer, polymerized product and polymerization initiator, the examples being one or a mixture of two or more of benzene, toluene, tetrahydrofuran, methyl ethyl ketone and dioxane. The fumaric acid diester monomer may be mixed with the selected solvent at any desired mixing ratio. The polymer solution after polymerization may be poured in a solvent for precipitation, such as methanol, to separate the solid polymer, or may be used directly in the liquid form.

Alternatively in a suspension polymerization process, a fumaric acid diester may be suspended in water added with a proper radical polymerization initiator to prepare a polymer thereof. In this case, a suspension stabilizer may be used optionally. Examples of stabilizers used for such purpose are partially hydrolyzed polyvinyl alcohol, methyl cellulose and sodium acrylate, inorganic compounds such as talc or calcium carbonate, and surface active agents such as sodium lauryl sulfate or sodium dodecylbenzene sulfonate. The polymer, i.e. the resultant polyfumaric acid diester, may be purified by washing and filtration.

A fumaric acid diester may be polymerized by an emulsion polymerization process, as described hereinbefore, wherein an aqueous emulsion is prepared by the use of an emulsifier and then added with a radical polymerization initiator. Emulsifiers, which may be used for this purpose, include sodium lauryl sulfate and sodium dodecylbenzene sulfonate, and nonionic surface active agents. The resultant polymer latex may be used directly in the liquid form, or the solid polymer contained therein may be separated by salting out in an aqueous solution of sodium chloride or sodium sulfate.

A variety of radical polymerization initiators may be used in the radical polymerization of fumaric acid diester, and the most pertinent radical polymerization initiators for individual polymerization processes varies depending on the particular polymerization methods and conditions employed. Polymerization initiators usable in the block, solution and suspension polymerization processes include, for example, organic peroxides such as diisopropyl peroxydicarbonate, di-n-propyl peroxydicarbonate, t-butyl peroxyneodecanoate, t-butyl peroxypivalate, lauroyl peroxide, benzoyl peroxide and acetyl peroxide, and azo compounds such as azobisisobutylonitrile and azobiscyclohexane carbonitrile. In the emulsion polymerization process, an aqueous solution of a peroxide, such as potassium persulfate, ammonium persulfate and hydrogen peroxide, may be used as the radical polymerization initiator, and may be added with sodium sulfite or sodium thiosulfate to accelerate the polymerization reaction.

In any cases, it is desirous that the radical polymerization initiator be used in an amount of 0.01 to 10 wt%, based on 100 wt% of the fumaric acid diester monomer. The polymerization reaction speed is extremely lowered if the amount of the radical polymerization initiator is less than 0.01 wt%, whereas the exothermic heat generated during the polymerization step increases too much to control the reaction temperature if the amount of the initiator is more than 10 wt%.

The reaction temperature for the polymerization of a certain fumaric acid diester used in the method of the invention may vary depending on the specific process employed and on the specific radical polymerization initiator used for initiating polymerization, and ranges preferably from 20° to 100° C., more preferably from 30° to 90° C.

A polyfumaric acid diester having a number average molecular weight ranging from 1,000 to 200,000 may be prepared and used in the method of the invention. When it is desired to obtain a polymer having a relatively high number average molecular weight, for example, ranging from about 50,000 to 200,000, it would be recommended, in general, to add 0.01 to 5 wt% of a radical polymerization initiator to 100 wt% of a fumaric acid diester to prepare a mixture which is then polymerized at a temperature of from 20° to 50° C. On the other hand, when it is desired to obtain a polymer having a relatively low number average molecular weight, for example, ranging from about 1,000 to 50,000, it would be recommended, in general, to add 5 to 10 wt% of a radical polymerization initiator to 100 wt% of a fumaric acid diester optionally with a chain transferring agent to prepare a mixture which is then polymerized at a temperature of from 50° to 100° C. The resultant polymer may be subjected to fractional precipitation to separate a polyfumaric acid diester fraction having a desired molecular weight.

The most important feature of the invention resides in the thermal treatment of the thus obtained polyfumaric acid diester having a number average molecular weight of from 1,000 to 200,000 to thereby introduce carboxyl groups having reactivity. As has been described above, since the fumaric acid diester used in the invention has ester residues, at least one of which includes a tert-butyl group, tert-butyl groups are necessarily included in the polyfumaric acid diester obtained by the polymerization thereof. It is a surprising finding that the tert-butyl groups of the polyfumaric acid diester are removed or expelled so that carboxyl groups are formed by a simple thermal treatment or only by heating, as shown by the following reaction equation:

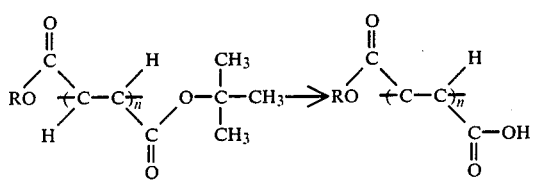

wherein R represents an alkyl group having 1 to 12 carbon atoms, a cycloalkyl group having 3 to 12 carbon atoms or an organic residue having at least one aromatic ring, and n is an integer.

The aforementioned thermal treatment may be effected simply by heating the polyfumaric acid diester in vacuum or in an atmosphere of air, carbon dioxide, nitrogen, argon, etc. at a temperature of from 150° to 300° C., preferably from 170° to 250° C. The heating temperature of lower than 150° C. is too low to remove the tert-butyl groups for the introduction of the carboxyl groups, whereas the product polyfumarate might be decomposed in some cases to deteriorate the properties if the heating temperature is higher than 300° C. The heating time varies depending on the heating temperature and the atmosphere in which heating is effected, and generally ranges from about 1 to 30 minutes, preferably from 5 to 20 minutes. If heating time is less than 1 minute, removal of the tert-butyl groups for the introduction of carboxyl groups is not effected completely. On the contrary, if heating continues over a period of more than 30 minutes, there arises a fear that the product polyfumarate tends to be decomposed. It is not essential that the polyfumaric acid diester is subjected to the thermal treatment singly, but the polyfumaric acid diester may be heated together with other materials if it is intended to prepare further modified polymers or compositions in combination with the other materials. In some cases, a polyfumaric acid diester may be heated together with an acidic or basic substance for introducing carboxyl groups, and it is also possible to heat a polyfumaric acid diester together with a metal to form an ionomer which has additional function. The thermal treatment or heating may be carried out in conventional extruders, injection molding machines, roll kneaders, Bumbury's mixers or standard type kneaders.

EXAMPLES OF THE INVENTION

The present invention will now be described with reference to some Examples, illustrated by way of example only, to facilitate more clear understanding of the invention. Meanwhile, in the following Examples, "%" stands for "% by weight" unless otherwise stated.

EXAMPLES 1 TO 3

Monomers of tert-butyl-iso-propyl fumarate, tert-butyl-cyclohexyl fumarate and tert-butyl-benzyl fumarate, all being purified by distillation, were used as the fumaric acid diesters. 100 g of each of the monomers was added with 1 g of diisopropyl peroxydicarbonate acting as a radical polymerization initiator, and polymerized at 37° C. for 48 hours in a four-necked flask provided with a thermometer, a reflux condenser, a stirrer and an $N_2$ gas introduction tube through suspension polymerization in an aqueous suspension which was prepared by adding 1 g of partially hydrolyzed polyvinyl alcohol, 10 g of calcium carbonate and 0.05 g of sodium dodecylbenzenesulfonate to 500 g of water. After the completion of polymerization, 100 cc of a 1% aqueous solution of hydrochloric acid was added to the polymerization system to treat with the acid, and then the resultant polymer was washed with water, filtered and dried to obtain a polyfumaric acid diester.

Each of the thus obtained polyfumaric acid diesters was then heated at 200° C. for 20 minutes in the flask while purging with nitrogen. After the completion of heating treatment, each product was examined through the IR analysis to obtain a spectrum chart on which an absorption peak at 1710 to 1690 cm$^{-1}$ indicating C=O and another absorption peak at 2500 to 3100 cm$^{-1}$ indicating —OH were found. The presence of —COOH groups had thus been confirmed by those characteristic absorption peaks. Removal of tert-butyl groups was confirmed by the percent weight reduction after the heating treatment. The molecular weight of each product was determined by the gel permeation chromatography. The results are shown in Table 1 together with the yields and percent weight reduction of respective products.

TABLE 1

| Example | 1 | 2 | 3 |
|---|---|---|---|
| Fumaric Acid Diester Monomer | t-Butyl-iso-propyl Fumarate | t-Butylcyclo-hexyl Fumarate | t-Butylbenzyl-Fumarate |
| Yield of Polymer (%) | 93 | 85 | 77 |
| Weight Reduction after Heating Treatment (%) | 24 | 22 | 21 |
| Number Average Molecular Weight (After Heating) | 151,600 | 104,800 | 80,100 |

EXAMPLES 4 TO 6

The same fumaric acid diester monomers as used in Examples 1 to 3 were polymerized through the following modified polymerization process. 20 g of each of the fumaric acid diesters and 2 g of benzoyl peroxide acting as a radical polymerization initiator were charged in a 30 cc glass ampule. After repeated cycles of substitution with $N_2$ and evacuation, the reaction system was confined in the ampule by sealing the opening of the ampule, and then the system was heated to 95° C. for 2 hours on a shaker to polymerize the fumaric acid diester. The polymer obtained by polymerization was dissolved in benzene, and the resultant polymer solution in benzene was poured into a large quantity of methanol/- water (6/4 in volume ratio) to precipitate the polymer. The polymer thus precipitated was filtered and dried.

The thus prepared polyfumaric acid diesters were subjected to heating treatment under the same conditions as described in Examples 1 to 3. The results of IR analyses indicated utterly the same absorption peaks revealing the presence of —COOH groups. The yields, molecular weights and percent weight reduction by heating are shown in Table 2.

TABLE 2

| Example | 4 | 5 | 6 |
|---|---|---|---|
| Fumaric Acid Diester Monomer | t-Butyl-iso-propyl Fumarate | t-Butylcyclo-hexyl Fumarate | t-Butylbenzyl-Fumarate |
| Yield of Polymer (%) | 91 | 87 | 75 |
| Weight Reduction after Heating Treatment (%) | 26 | 23 | 20 |
| Number Average Molecular Weight (After Heating) | 18,500 | 8,080 | 4,300 |

Although the present invention has been described with reference to the specific examples, it should be understood that various modifications and variations can be easily made by those skilled in the art without departing from the spirit of the invention. Accordingly, the foregoing disclosure should be interpreted as illustrative only and not to be interpreted in a limiting sense. The present invention is limited only by the scope of the following claims.

What is claimed is:

1. A method for modifying a polyfumaric acid diester comprising subjecting the polyfumaric acid diester having a number average molecular weight of 1,000 to 200,000 to thermal treatment effected by heating said fumaric acid diester at a temperature of from 150° to 300° C. for 1 to 30 minutes in an atmosphere of a gas selected from the group consisting of air, carbon dioxide, argon and nitrogen or in vacuum, to thereby obtain a polyfumarate having carboxyl groups, said polyfumaric acid diester being obtained by polymerizing a fumaric acid diester represented by the following general formula of:

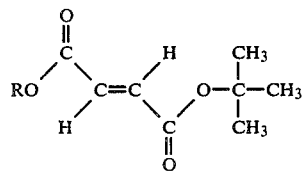

wherein R represents an alkyl group having 1 to 12 carbon atoms, a cycloalkyl group having 3 to 12 carbon atoms or benzyl, β-phenethyl or α-phenethyl.

2. A method according to claim 1, wherein said fumaric acid diester is polymerized through radical polymerization at a temperature of from 20° to 100° C. in the presence of a radical polymerization initiator.

3. A method according to claim 2, wherein said fumaric acid diester is polymerized through radical polymerization at a temperature of from 20° to 50° C. while using 0.01 to 5 wt% of a radical polymerization initiator, based on 100 wt% of the fumaric acid diester, to obtain said polyfumaric acid diester having a number average molecular weight of from 50,000 to 200,000.

4. A method according to claim 2, wherein said fumaric acid diester is polymerized through radical polymerization at a temperature of from 50° to 100° C. while using 5 to 10 wt% of a radical polymerization initiator, based on 100 wt% of the fumaric acid diester, to obtain said polyfumaric acid diester having a number average molecular weight of from 1,000 to 50,000.

5. A method according to claim 1, wherein said alkyl group is selected from the group consisting of methyl, ethyl, iso-propyl, n-propyl, n-butyl, iso-butyl, sec-butyl, tert-butyl and 2-ethylhexyl and said cycloalkyl group is selected from the group consisting of cyclopentyl, cyclohexyl, and biscyclohexyl.

* * * * *